(12) United States Patent
Lu et al.

(10) Patent No.: US 10,270,354 B1
(45) Date of Patent: Apr. 23, 2019

(54) SYNCHRONOUS RECTIFIER CONTROLLER INTEGRATED CIRCUITS

(71) Applicant: TEXAS INSTRUMENTS INCORPORATED, Dallas, TX (US)

(72) Inventors: Bing Lu, Bedford, NH (US); Bharath Balaji Kannan, Merrimack, NH (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 16/044,952

(22) Filed: Jul. 25, 2018

(51) Int. Cl.
*H02M 3/335* (2006.01)
*H02M 1/32* (2007.01)
*H02M 3/338* (2006.01)

(52) U.S. Cl.
CPC ........ *H02M 3/33592* (2013.01); *H02M 1/32* (2013.01); *H02M 3/3385* (2013.01)

(58) Field of Classification Search
CPC ......... H02M 3/33507; H02M 3/33592; H02M 1/10; H02M 2001/0019; Y02B 70/16
USPC ........ 363/16–20, 21.02, 21.06, 21.08, 21.12, 363/21.14, 89, 127
See application file for complete search history.

(56) References Cited

U.S. PATENT DOCUMENTS

| | | | | |
|---|---|---|---|---|
| 6,995,991 B1 * | 2/2006 | Yang | ................. | H02M 3/33592 363/21.14 |
| 7,936,575 B2 * | 5/2011 | Hu | ..................... | H02M 3/33592 363/21.06 |
| 8,830,702 B2 * | 9/2014 | Macfarlane | ......... | H02M 1/4225 363/16 |
| 8,964,420 B2 * | 2/2015 | Zhang | ............... | H02M 3/33592 363/21.12 |
| 9,306,464 B2 * | 4/2016 | Yang | ................. | H02M 3/33592 |

* cited by examiner

*Primary Examiner* — Rajnikant B Patel
(74) *Attorney, Agent, or Firm* — Tuenlap Chan; Charles A. Brill; Frank D. Cimino (57) ABSTRACT

A synchronous rectifier controller integrated circuit. The synchronous rectifier controller integrated circuit comprises a continuous current mode (CCM) detection circuit configured to detect CCM operation based on sensing a voltage at a pre-defined point in a rectification cycle; a multiplexer having a first reference voltage signal input, a second reference voltage signal input, an output, and a selector input coupled to the CCM detection circuit; and a gate voltage driver circuit coupled to the output of the multiplexer.

19 Claims, 7 Drawing Sheets

SYNCHRONOUS RECTIFIER CONTROLLER INTEGRATED CIRCUITS

BACKGROUND

Switch mode direct current to direct current (DC-to-DC) converters generate DC voltage for use by various electrical devices. Switch mode DC-to-DC converters are used to recharge mobile phones, laptop computers, battery-powered hand tools, and other devices with batteries. Switch mode DC-to-DC converters are used in electric and electronic devices that do not contain a battery. Switch mode DC-to-DC converters are used to provide DC power to other devices. Switch mode DC-to-DC converters use electronic switches, such as metal oxide semiconductor (MOS) field effect transistors (FETs), to interrupt current through a portion of the power stage of a switch mode DC-to-DC converter. A first mode of operation involves storing energy in a magnetic field of a winding, and a second mode of operation, initiated by switching the circuit mode of the switch mode DC-to-DC converter, involves drawing that magnetic field energy out of the winding and delivering it to an output of the power stage.

SUMMARY

In accordance with at least one example of the disclosure, a synchronous rectifier controller integrated circuit comprises a continuous current mode (CCM) detection circuit configured to detect CCM operation based on sensing a voltage at a pre-defined point in a rectification cycle, a multiplexer having a first reference voltage signal input, a second reference voltage signal input, an output, and a selector input coupled to the CCM detection circuit, and a gate voltage driver circuit coupled to the output of the multiplexer.

In accordance with at least one example of the disclosure, a synchronous rectifier controller integrated circuit (SRC IC) comprises an on-time tracking circuit configured to store an on-time duration of a previous switching cycle of the SRC IC, to track an on-time duration in a current switching cycle of the SRC IC, and to output a trigger signal via an output of the on-time tracking circuit, a continuous current mode (CCM) detection circuit coupled to the output of the on-time tracking circuit and configured to output a CCM detected signal based on determining that a value of a drain to source voltage of the SRC IC is less than a first threshold value, a multiplexer having a selector input coupled to the CCM detection circuit and configured to couple a first reference voltage source to an output of the multiplexer when the selector input receives a logic high value and to couple a second reference voltage source to the output of the multiplexer when the selector input receives a logic low value, and a gate voltage driver circuit coupled to the output of the multiplexer, wherein the gate voltage driver circuit drives a gate pin of the SRC IC to modulate the drain to source voltage of the SRC IC based on a value of a voltage present on the output of the multiplexer.

In accordance with at least one example of the disclosure, a flyback switch mode direct current-to-direct current (DC-to-DC) converter comprises a primary winding coupled to an electrical power supply and a first electronic switch, a secondary winding configured to receive energy from the primary winding via magnetic flux coupling between the primary winding and the secondary winding, a second electronic switch configured to rectify electrical current in the secondary winding, and a synchronous rectifier controller integrated circuit. The synchronous rectifier controller integrated circuit comprises a continuous current mode (CCM) detection circuit coupled to the second electronic switch, a multiplexer having a selector input coupled to the CCM detection circuit having a first signal input configured to receive a first reference voltage signal, a second signal input configured to receive a second reference voltage signal, and an output, and a gate voltage driver circuit coupled to the output of the multiplexer and configured to control the second electronic switch.

BRIEF DESCRIPTION OF THE DRAWINGS

For a detailed description of various examples, reference will now be made to the accompanying drawings in which.

DETAILED DESCRIPTION

Switch mode direct current-to-direct current (DC-to-DC) converters operate in discontinuous current mode (DCM) of operation or in continuous current mode (CCM) of operation. An electronic switch, such as a metal oxide semiconductor field effect transistor (MOSFET), is used to rectify current in an output power stage. The electronic switch is controlled by a synchronous rectifier controller chip to replace a lossy diode rectifier used in earlier designs and thereby improve efficiency of the switch mode DC-to-DC converter. A flyback switch mode DC-to-DC converter with a synchronous rectifier in the secondary portion of the converter, when operated in CCM, is subject to edge operating conditions that stress the electronic switch and threaten premature degradation and failure of the electronic switch. To protect the electronic switch in such synchronous rectifier topologies when operating in CCM, complicated and/or large footprint snubber circuitry is configured in parallel with the electronic switch. This large snubber circuitry consumes circuit board space undesirably and represents an undesired extra cost. Additionally, this snubber circuitry does not promote efficient operation of the switch mode DC-to-DC converter (e.g., heat dissipation and energy loss remain undesirably high).

The present disclosure discloses a synchronous rectifier controller (SRC) integrated circuit (IC) that detects when the switch mode DC-to-DC converter is operating in DCM and when it is operating in CCM. When the switch mode DC-to-DC converter is operating in DCM, the SRC IC begins to lower a gate voltage (e.g., control signal) to an electronic switch to vary the switch from full-on to a lesser-on state. In DCM, the SRC IC modulates the gate voltage beginning when a drain voltage value of the electronic switch passes a first threshold and turns the gate voltage completely off when the drain voltage value of the electronic switch passes a second threshold. The SRC IC modulates the gate voltage to attempt to maintain the drain voltage value at a first threshold, with reference to change in current in the electronic switch. This technique brings the gate voltage closer to the threshold voltage of the electronic switch, thereby more easily shutting the electronic switch off just before the electronic switch would experience current in a reverse direction. By modulating the gate voltage lower, the SRC IC makes turning the electronic switch off easier and promotes fast transition of the electronic switch state.

In the event that the drain voltage does not reach the first threshold at a specific point in the time of the switching cycle, the SRC detects it as a CCM switching condition. In CCM, the SRC IC modulates the gate voltage beginning after the specific point in the time of the switching cycle when the CCM switching condition is detected to regulate the drain voltage at a third threshold. This technique succeeds in shutting the electronic switch off just before the electronic switch would experience current from the drain to the source (e.g., in the reverse direction). By modulating the gate voltage lower, the SRC IC makes turning the electronic switch off easier and promotes fast transition of the electronic switch. In CCM, the drain voltage typically remains relatively high in amplitude (for example a more negative value) and the current through the electronic switch remains relatively high until the time the electronic switch should be shut off. By detecting the DCM versus the CCM operation of the switch mode DC-to-DC converter and by using different modulation thresholds in CCM versus DCM, the SRC IC improves the efficiency of the switch mode DC-to-DC converter, allows for using smaller snubbers, and reduces the stress on the electronic switch.

Figure 1:
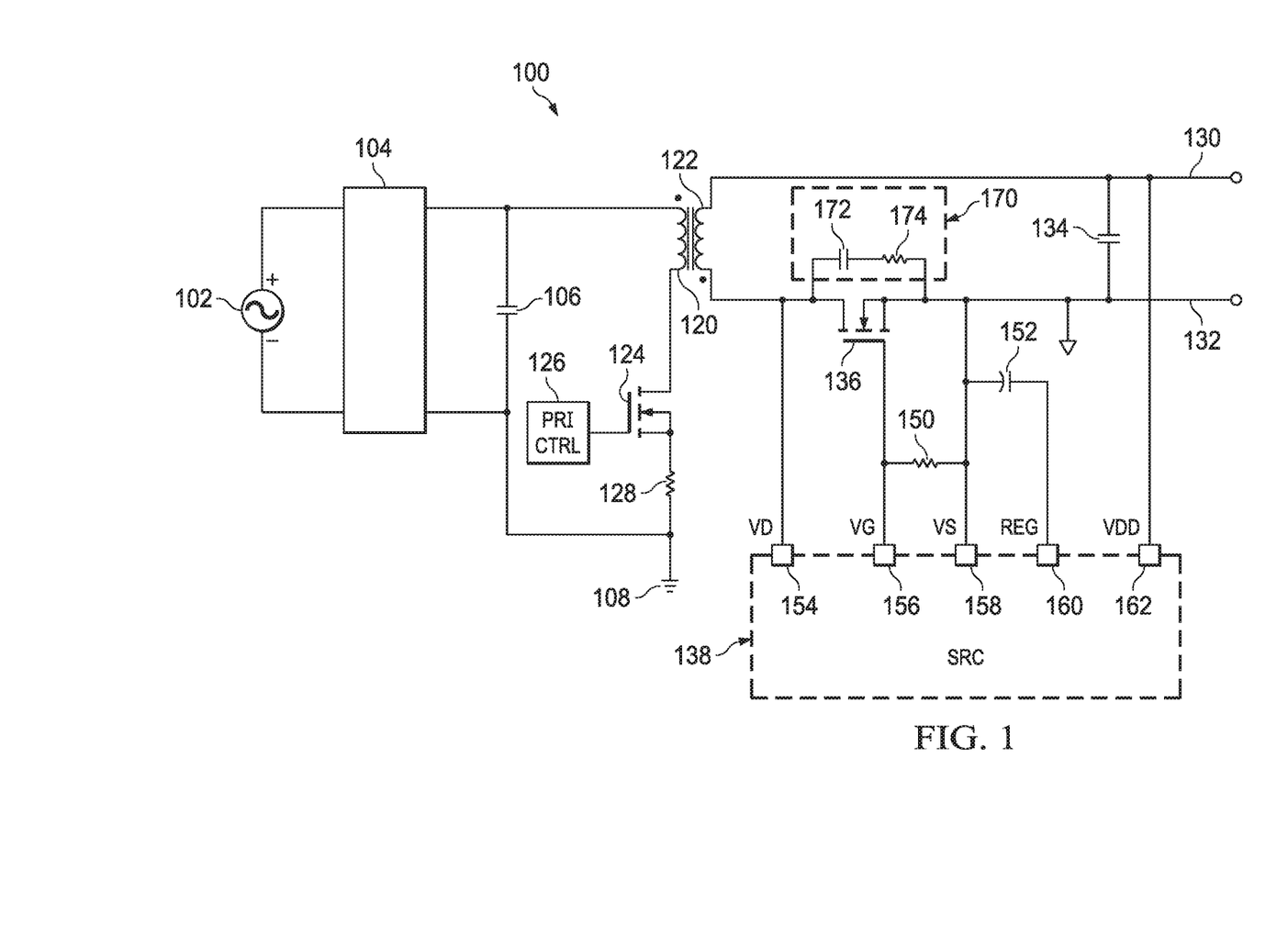
FIG. 1 shows a switch mode DC-to-DC converter in a flyback topology in accordance with various examples.

FIG. 1 shows an example of a switch mode DC-to-DC converter 100. In an example, the switch mode DC-to-DC converter 100 comprises an alternating current (AC) electric power source 102, a rectifier 104, a first capacitor 106, and a first ground 108. The AC electric power source 102 may be provided by AC mains power, for example from an electric power outlet. An example circuit for embodying the rectifier 104 is described with reference to FIG. 2 below.

The switch mode DC-to-DC converter 100 further comprises a primary winding 120 configured to transfer energy to a secondary winding 122. In an example, the primary winding 120 and the secondary winding 122 are wound on a common core that promotes efficient coupling of the magnetic field. The switch mode DC-to-DC converter 100 further comprises a first electronic switch 124 (such as a MOSFET), a primary controller 126, and a first resistor 128. The rectifier 104 provides rectified DC power to the primary winding 120. In an embodiment, the AC electrical power source 102 and the rectifier 104 are an electrical power supply. In an embodiment, the rectifier 104 is an electrical power supply that is configured to receive AC power from an external source, such as AC mains power. The primary controller 126 turns the first electronic switch 124 on and off to transfer power from the primary winding 120 to the secondary winding 122.

In an example, the switch mode DC-to-DC converter 100 further comprises a DC output 130, a second ground 132, a second capacitor 134, and a second electronic switch 136. In FIG. 1, note that the second ground 132 is decoupled from the first ground 108 by the magnetic coupling between the primary winding 120 and the secondary winding 122. In an example, the second electronic switch 136 is a MOSFET. In an example, the first ground 108 and the second ground 132 are coupled to each other. In an example, a snubber 170 is connected in parallel from a source lead to a drain lead of the second electronic switch 136. In an example, the snubber 170 is a snubber capacitor 172 in series with a snubber resistor 174.

In one implementation, the switch mode DC-to-DC converter 100 further comprises a synchronous rectifier controller (SRC) integrated circuit (IC) 138. In another implementation, the SRC IC 138 can be embedded in the switch mode DC-to-DC converter 100 to form a single IC. The SRC IC 138 controls the second electronic switch 136 to turn on and turn off based on conditions in the switch mode DC-to-DC converter 100. In an example, the SRC IC 138 controls the second electronic switch to turn on and turn off based on a voltage present on a drain lead of the second electronic switch 136. In an example, the SRC IC 138 has a VD pin 154 coupled to the drain lead of the second electronic switch 136, a VG pin 156 coupled to a gate lead of the second electronic switch 136, a VS pin 158 coupled to a source lead of the second electronic switch 136, a REG pin 160 coupled through a third capacitor 152 to the source lead of the second electronic switch 136, and a VDD pin 162 coupled to the DC output 130. In an example, a second resistor 150 is coupled between the VG pin 156 and the VS pin 158. The teachings of the present disclosure are applicable to other configurations of switch mode DC-to-DC converters that vary from the topology of the example switch mode DC-to-DC converter depicted in FIG. 1.

Figure 2:
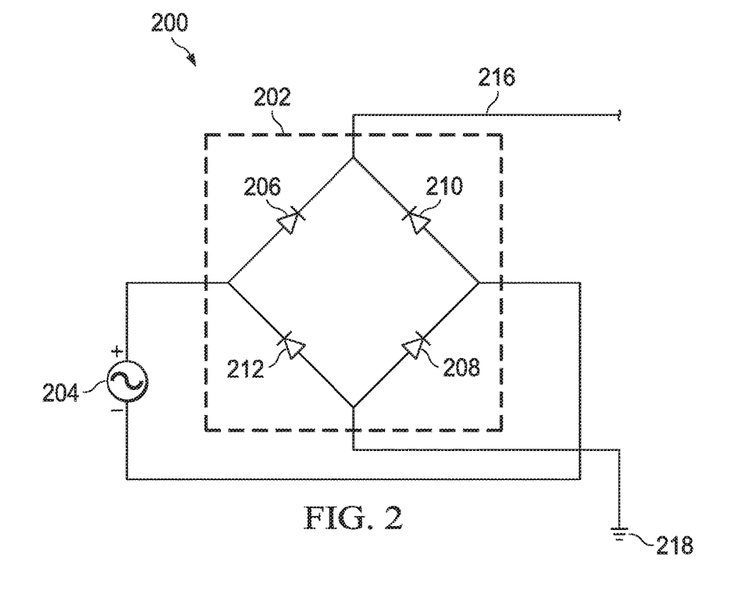
FIG. 2 shows a full-wave rectifier in accordance with various examples.

FIG. 2 shows an electric system 200. In an example, the system comprises a full-wave rectifier 202, and the rectifier 104 described above with reference to FIG. 1 is implemented as the full-wave rectifier 202. In another example, however, the rectifier 104 employs different components and/or different circuit topology. In an example, the system 200 comprises an AC electric power source 204. The AC electric power source 204 may be provided by AC mains power, for example from an electric power outlet. The system 200 provides positive DC voltage output 216 for use by other systems such as the primary winding 120 of the switch mode DC-to-DC converter 100 described above with reference to FIG. 1. The system 200 is coupled to a ground 218.

In an example, the full-wave rectifier 202 comprises a first diode 206, a second diode 208, a third diode 210, and a fourth diode 212. In a positive half of a switching cycle of the AC electric power source 204, electric current flows out of the terminal of the AC electric power source 204 designated as positive (+), is blocked by the fourth diode 212 because it is reverse biased, and flows into the first diode 206. The electric current flows out of the first diode 206, is blocked by the third diode 210 because it is reverse biased, and flows to the output 216 to supply a circuit load (e.g., the primary winding 120). The electric current flows out of the ground 218 and flows into the second diode 208. The electric current flows out of the second diode 208 and into the terminal of the AC electric power source 204 designated as negative (−), thus completing the current loop during the positive half of the switching cycle of the AC electric power source 204.

In a negative half of the switching cycle of the AC electric power source 204, electric current flows out of the negative terminal of the AC electric power source 204, is blocked by the second diode 208 because it is reverse biased, and flows into the third diode 210. The current flows out of the third diode 210, is blocked by the first diode 206 because it is reverse biased, and flows to the output 216 to supply the circuit load. The electric current flows out of the ground 218 and flows into the fourth diode 212. The current flows out of the fourth diode 212 and into the positive terminal of the AC electric power source 204, thus completing the current loop during the negative half of the switching cycle of the AC electric power source 204.

Figure 3:
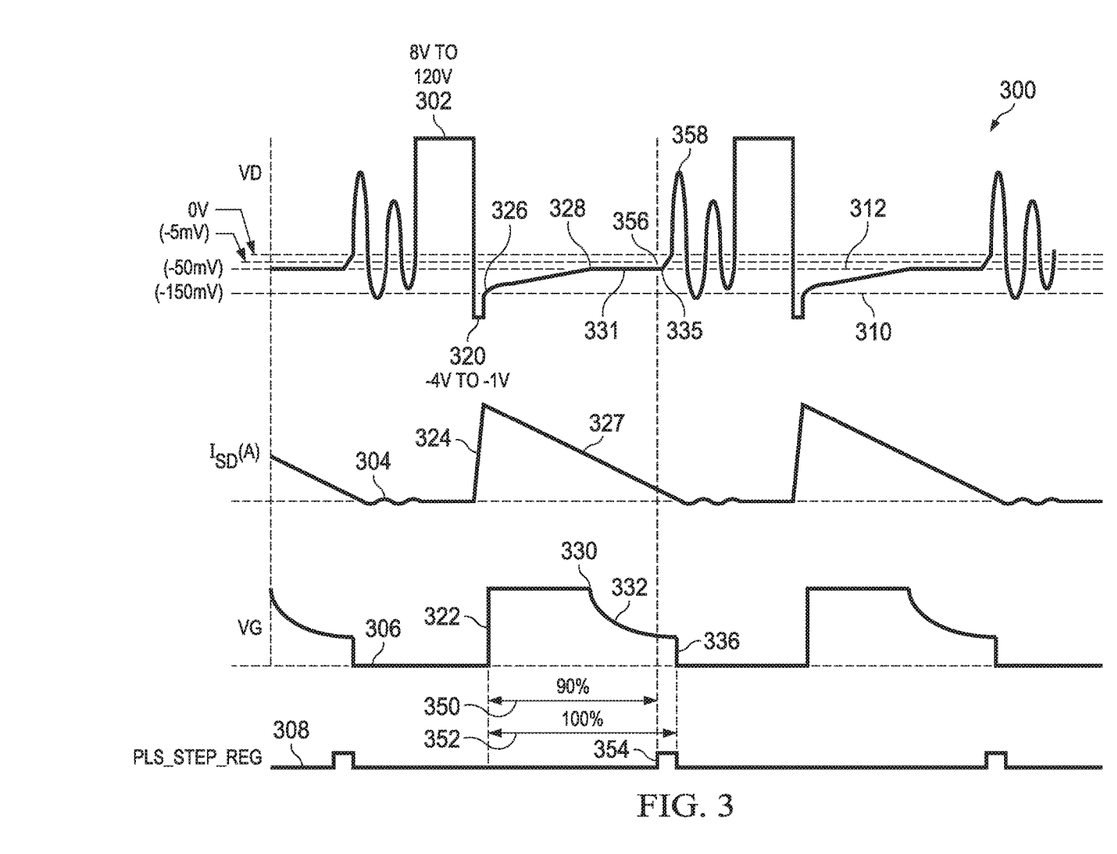
FIG. 3 shows waveforms associated with a discontinuous current mode (DCM) of operation of a switch mode DC-to-DC converter in a flyback topology in accordance with various examples.

FIG. 3 shows a graph 300 of waveforms associated with a DCM operation of the switch mode DC-to-DC converter 100 described above. A first waveform 302 represents a drain voltage of the second electronic switch 136 with reference to time, a second waveform 304 represents a current through the second electronic switch 136 with reference to time, a third waveform 306 represents a gate voltage of the second electronic switch 136 with reference to time, and a fourth waveform 308 represents a pulse 354 generated internally by the SRC IC 138 with reference to time. When the third waveform 306 is high, the second electronic switch 136 is turned on and continues the current conduction at a lower conduction loss as seen in the second waveform 304. When the third waveform 306 is low, the second electronic switch 136 is turned off and the current flows through the second electronic switch 136 inherent body diode as seen in the second waveform 304 (e.g., when the second electronic switch 136 is turned off, it acts in accordance with an inherent body diode). When the first waveform 302 is high, the primary winding 120 is storing energy in the form of magnetic flux in its coils; when the first waveform 302 is low, the primary winding 120 is transferring stored energy to the secondary winding 122.

When the drain voltage drops below 0 volts (at point 320 in the first waveform 302), the second electronic switch 136 inherent body diode (e.g., an internal parasitic diode of the MOSFET) is forward biased from body diode to drain, the gate voltage is set high by the SRC IC 138 (at point 322 in the third waveform 306), and the second electronic switch 136 begins to turn on and conduct current (at point 324 of the second waveform 304, with much less voltage drop as compared to the voltage drop across the inherent body diode of the second electronic switch 136). When the second electronic switch 136 is fully turned on (at point 326 in the first waveform 302), the second waveform 304 is at its maximum (e.g., maximum current flows through the second electronic switch 136). As the stored energy in the secondary winding 122 is drawn down, the second waveform 304 decreases (less current flows through the second electronic switch 136), and the magnitude of the voltage drop across the second electronic switch 136 drops (e.g., the drain voltage represented in the first waveform 302 increases from a more negative voltage value to a less negative voltage value).

When the drain voltage increases above a first voltage threshold (at point 328 in the first waveform 302), the SRC IC 138 begins to modulate the gate voltage via the VG pin 156 to maintain the drain voltage at the first voltage threshold. This modulation of the gate voltage is seen as a concave curve 332 in the third waveform 306. When the drain voltage increases above the second voltage threshold (point 335 in the first waveform 302), the SRC IC 138 drops the gate voltage to about zero volts relative to a ground voltage (at point 336 in the third waveform 306). When the gate voltage drops to about zero volts, the second electronic switch 136 turns off. When the second electronic switch 136 turns off, the second waveform 304 drops to zero current. By the SRC IC 138 dropping the gate voltage from a fully on value (at point 330 in the third waveform 306) to a lower value, the second electronic switch 136 is closer to an off state and is able to be turned off more rapidly when the gate voltage is set to zero at point 336 in the third waveform 306.

The selection of the first voltage threshold is determined as a tradeoff between the conduction loss and the turn-off performance of the second electronic switch 136. If the first voltage threshold is selected to be more negative, the SRC IC 138 modulates the voltage drop of the second electronic switch 136 to be relatively higher, forcing the gate voltage to be lower earlier in the cycle. This, in turn, improves the turn-off performance of the second electronic switch 136 at the cost of increased conduction loss of the second electronic switch 136. If the first voltage threshold is selected to be less negative, the gate voltage is reduced relatively later in the cycle, which reduces conduction loss of the second electronic switch 136 at the cost of decreased turn-off performance of the second electronic switch 136 (e.g., the risk of reverse current increases).

The SRC IC 138 monitors the gate voltage to determine an on-time period or on-time duration of the second electronic switch 136 or of the gate. This time extends from point 322 to point 336 in the third waveform 306. This corresponds to a time period 352. The SRC IC 138 maintains a history of the previous on-time period from switching cycle to switching cycle of the switch mode DC-to-DC converter 100. The SRC IC 138 determines when a predefined fraction of the on-time period has passed, for example 90% of the previous on-time period, and generates the pulse 354 in the fourth waveform 308 at that point in the gate on period. The SRC IC 138 uses this event (e.g., the leading edge of the pulse 354) to sample the drain voltage (at point 356 in the first waveform 302). If this drain voltage is greater than (less negative than) the first voltage threshold, the SRC IC 138 infers that the switch mode DC-to-DC converter 100 is operating in DCM. If this drain voltage is less than (more negative than) the first voltage threshold at point 356, the SRC IC 138 infers that the switch mode DC-to-DC converter 100 is operating in CCM. In the graph 300, the drain voltage is greater than (less negative than) the first voltage threshold on the event of the leading edge of the pulse 354. When the second electronic switch 136 is turned off while the switch mode DC-to-DC converter 100 is operating in DCM, the drain voltage experiences a transient oscillation (at point 358 in the first waveform 302). In an example, the first threshold is about −50 mV and the second threshold is about −10 mV. In an example, the first threshold is about −30 mV and the second threshold is about −5 mV. As used herein, the term 'about' when applied to a numeric value means a value +1-10% of the stated value. In an example, the first threshold is greater than −50 mV.

Figure 4:
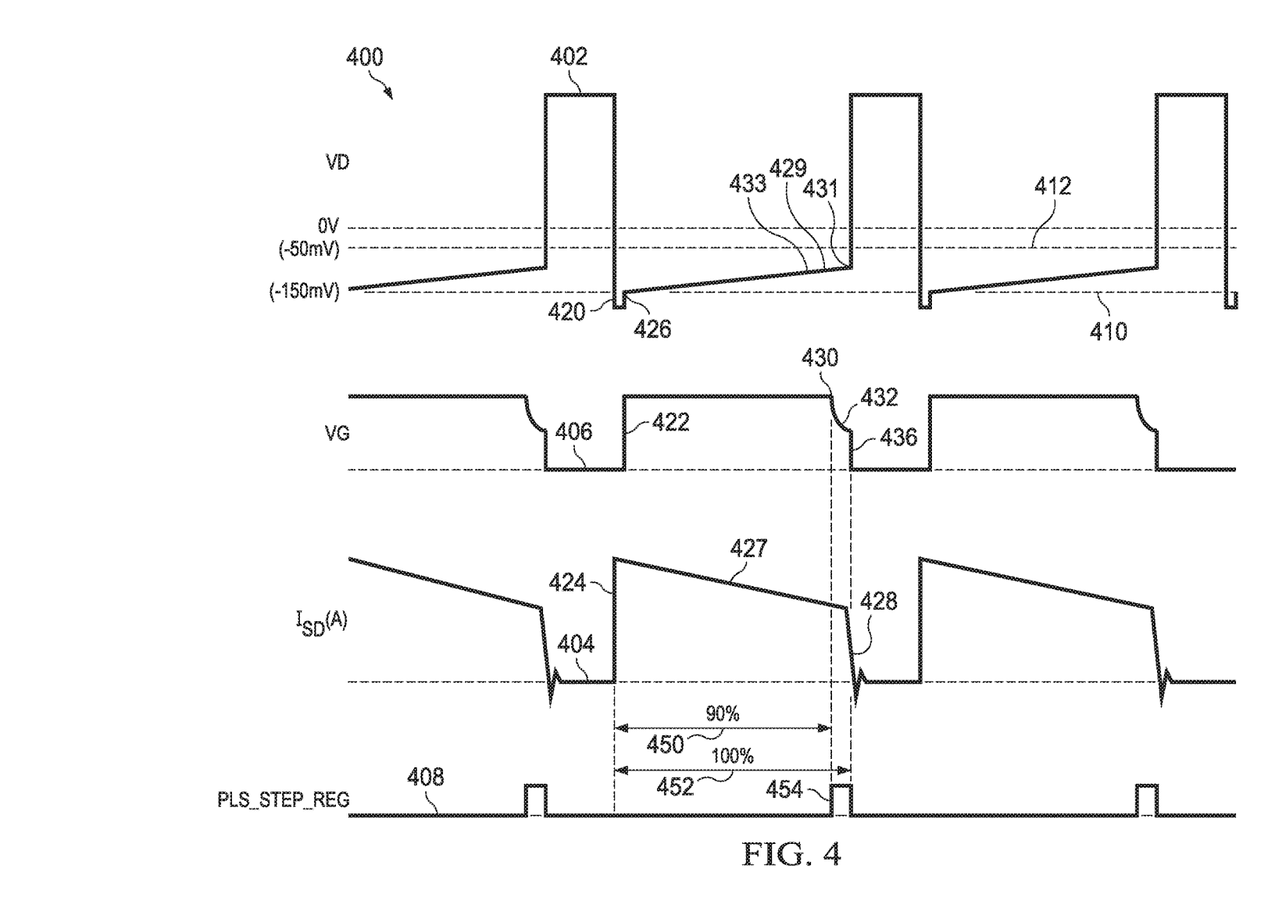
FIG. 4 shows waveforms associated with a continuous current mode (CCM) of operation of a switch mode DC-to-DC converter in accordance with various examples.

FIG. 4 shows a graph 400 of waveforms associated with a CCM operation of the switch mode DC-to-DC converter 100 described above. A fifth waveform 402 represents a drain voltage of the second electronic switch 136 with reference to time, a sixth waveform 404 represents a current through the second electronic switch 136 with reference to time, a seventh waveform 406 represents a gate voltage of the second electronic switch 136 with reference to time, and an eighth waveform 408 represents a pulse 454 generated internally by the SRC IC 138 with reference to time. When the seventh waveform 406 is high, the second electronic switch 136 is turned on and continues the current conduction at a lower conduction loss as seen in the sixth waveform 404. When the seventh waveform 406 is low, the second electronic switch 136 is turned off, and the current flows through the second electronic switch 136 inherent body diode as seen in the sixth waveform 404 (e.g., when the second electronic switch is turned off, it acts in accordance with the inherent body diode). When the fifth waveform 402 is high, the primary winding 120 is storing energy in the form of magnetic flux in its coils; when the fifth waveform 402 is low, the primary winding 120 is transferring stored energy to the secondary winding 122. In CCM operation, the second electronic switch 136 conducts more current than in the DCM operation. In addition, at the point the second electronic switch 136 turns off (at point 436 in the seventh waveform 406), the current through the second electronic switch 136 remains high relative to the current through the second electronic switch 136 during DCM operation at the corresponding point in the switching cycle (at point 336 in the third waveform 306).

When the drain voltage drops below 0 volts (at point 420 in the fifth waveform 402), the second electronic switch 136 is forward biased from source to drain, and the gate voltage is set high by the SRC IC 138 (at point 422 in the seventh waveform 406). When the gate voltage is set high, the second electronic switch 136 begins to turn on and conduct current (at point 424 of the sixth waveform 404, with significantly less voltage drop as compared to the voltage drop across the inherent body diode of the second electronic switch 136). When the second electronic switch 136 is fully turned on (at point 426 in the fifth waveform 402), the sixth waveform 404 is at its maximum (e.g., maximum current flows through the second electronic switch 136). As the stored energy in the secondary winding 122 is drawn down, the sixth waveform 404 decreases (less current flows through the second electronic switch 136), and the magnitude of the voltage drop across the second electronic switch 136 decreases (e.g., the drain voltage represented in the fifth waveform 402 increases from a more negative voltage value to a less negative voltage value).

When the predefined time duration 450 has passed since the start of the high gate voltage (point 422 in the seventh waveform 406), the SRC IC 138 begins to modulate the gate voltage via the VG pin 156. This modulation of the gate voltage is seen as a concave curve 432 in the seventh waveform 406. The third voltage threshold is less (a greater negative value) than the first voltage threshold. In an example, the third voltage threshold is less (a greater negative value) than the first voltage threshold. In an example, the third voltage threshold is greater than −150 mV and less than −55 mV. In CCM operation, the drain voltage, even if the gate voltage were not modulated, does not rise to the first voltage threshold before the drain voltage is driven strongly positive by the switching of the switch mode DC-to-DC converter 100. For this reason, the SRC IC 138 of the present disclosure detects the CCM, and uses different drain voltage value thresholds at specific points in time for beginning to modulate the gate voltage. By reducing the gate voltage on the second electronic switch 136, the second electronic switch 136 can be more rapidly turned off when desired, thereby avoiding strong reverse currents in the second electronic switch 136. Avoiding strong reverse currents permits decreasing the size of the snubber circuitry 170 in parallel with the second electronic switch 136. The selection of the third voltage threshold is determined as a tradeoff between the conduction loss and the turn-off performance of the second electronic switch 136, similar to the description provided above regarding selection of the first voltage threshold.

When the drain voltage increases above the second voltage threshold (point 431 in the fifth waveform 402), the SRC IC 138 drops the gate voltage to about zero volts relative to a ground voltage (at point 436 in the seventh waveform 406). When the second electronic switch 136 turns off, the sixth waveform 404 drops to zero current. Note that by dropping the gate voltage from fully on value (at point 430 in the seventh waveform 406) to a lower value, the second electronic switch 136 is closer to an off state and is able to be turned off more rapidly when the gate voltage is set to zero at point 436 in the seventh waveform 406.

The SRC IC 138 monitors the gate voltage to determine an on-time period of the gate or of the second electronic switch 136. This time extends from point 422 to point 436 in the seventh waveform 406. This corresponds to time period 452. The SRC IC 138 maintains a history of the previous on-time period from switching cycle to switching cycle of the switch mode DC-to-DC converter 100. The SRC IC 138 determines when a predefined fraction of the on-time period has passed in the current switching cycle, for example 90% of the on-time period, and generates the pulse 454 in the eighth waveform 408 at that point in the on-time period. The SRC IC 138 uses this event (e.g., the leading edge of the pulse 454) to sample the drain voltage (at point 433 in the fifth waveform 402). If this drain voltage is greater than (less negative than) the first voltage threshold, the SRC IC 138 infers that the switch mode DC-to-DC converter 100 is operating in DCM. If this drain voltage is less than (more negative than) the first voltage threshold, the SRC IC 138 infers that the switch mode DC-to-DC converter 100 is operating in CCM. Thus, the SRC IC 138 detects the CCM operation based on sensing the drain to source voltage at a pre-defined point in the rectification cycle. In the graph 400, the drain voltage is less than (more negative than) the first voltage threshold on the event of the leading edge of the pulse 454. Note that when the second electronic switch 136 is turned off while the switch mode DC-to-DC converter 100 is operating in CCM, the drain voltage does not experience a transient oscillation as it did in DCM.

Figure 5:
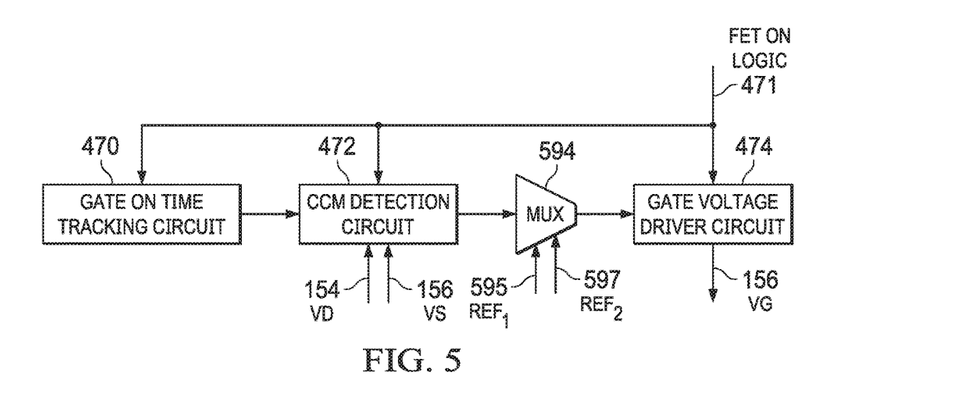
FIG. 5 shows functional blocks of a synchronous rectifier controller in accordance with various examples.

FIG. 5 shows an illustration of some functional blocks of the synchronous rectifier controller IC 138. The blocks comprise an on-time tracking circuit 470, a continuous current mode (CCM) detection circuit 472, a multiplexer 594, and a gate voltage driver circuit 474. In some contexts, the gate voltage driver circuit 474 is referred to as a gate driver circuit. The synchronous rectifier controller IC 138 develops a "FET ON" logic signal 471 (e.g., the MOSFET device implementing the second electronic switch is in an ON state) that is high when the second electronic switch 136 is turned on and low when the second electronic switch 136 is turned off. This provides an input to the on-time tracking circuit 470, to the CCM detection circuit 472, and to the gate voltage driver circuit 474. An output of the on-time tracking circuit 470 to the CCM detection circuit 472 signals when the CCM detection circuit 472 should evaluate the mode of operation of the switch mode DC-to-DC converter 100, for example at a point in the current switch cycle corresponding to 90% of the on-time duration of the previous switching cycle of the switch mode DC-to-DC converter 100. In some contexts, the output of the on-time tracking circuit 470 to the CCM detection circuit 472 is referred to as a trigger signal or as triggering the evaluation of the mode of operation of the switch mode DC-to-DC converter 100. In some contexts, the on-time tracking circuit 470 is said to track the duration of time that the gate of the second electronic switch 136 is turned on (e.g., a fourth capacitor 504, described below with reference to FIG. 6, accumulates a voltage that is proportional to the duration of time the gate is turned on, hence tracking the on-time). The CCM detection circuit 472 evaluates a drain to source voltage of the second electronic switch 136 based on a voltage value present on the VD pin 154 and a voltage present on the VS pin 156 of the SRC IC 138 to determine whether the switch mode DC-to-DC converter 100 is operating in CCM or not (e.g., in DCM). In some contexts this is referred to as a sensed drain to source voltage. If the drain to source voltage is less than a first voltage threshold (e.g., less than −50 mV, more negative than −50 mV) at this point in time, the CCM detection circuit 472 deems the switch mode DC-to-DC converter 100 to be operating in CCM operation mode. Thus, the CCM detection circuit 472 detects the CCM operation based on sensing the drain to source voltage at a pre-defined point in the rectification cycle.

The CCM detection circuit 472 outputs a CCM signal to a selector input of the multiplexer 594. If the CCM signal is logic high (e.g., the switch mode DC-to-DC converter 100 is operating in CCM operation mode), the multiplexer 594 outputs a voltage to the gate voltage driver circuit 474 that is sourced from a first voltage reference source 597. The first voltage reference source 597 outputs a first voltage reference signal. If the CCM signal is logic low, the multiplexer 594 outputs a voltage to the gate voltage driver circuit 474 that is sourced from a second voltage reference source 595. The second voltage reference source 595 outputs a second reference voltage signal. The gate voltage driver circuit 474 modulates a gate voltage output to VG pin 156 based on the voltage input from the multiplexer 594.

Figure 6:
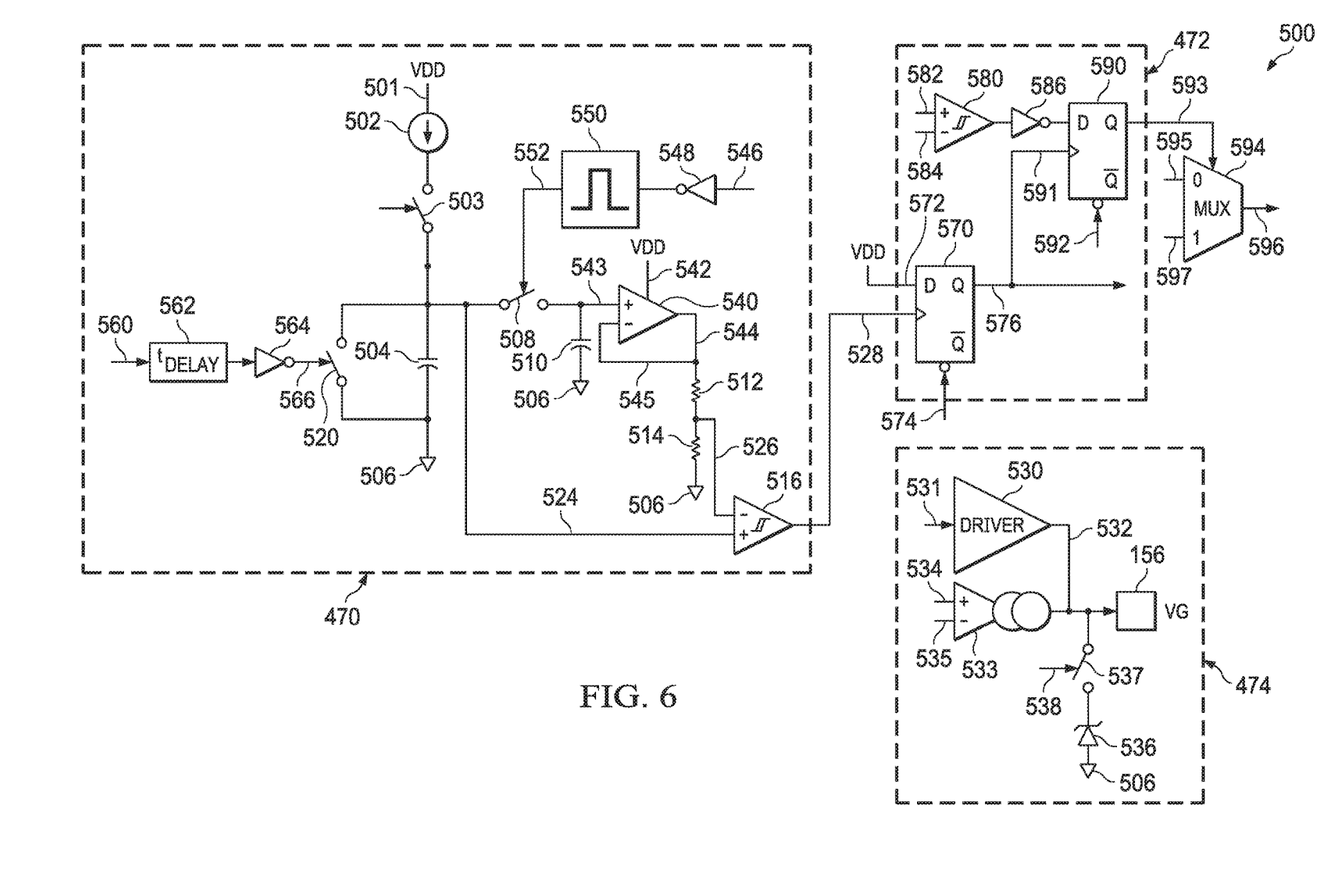
FIG. 6 shows a circuit of a synchronous rectifier controller in accordance with various examples.

FIG. 6 shows a circuit 500. In an example, the circuit 500 can be used for implementing several functional and structural features of the SRC IC 138, as well as those as described in FIG. 5. In an example, the circuit 500 is used to generate the pulse 354 and the pulse 454 described above with reference to FIG. 3 and FIG. 4 and used to determine if the switch mode DC-to-DC converter 100 is operating in DCM or in CCM operation. In an example, the circuit 500 further generates a drain to source voltage threshold signal, differentiated based on whether the switch mode DC-to-DC converter 100 is operating in DCM or in CCM operation, for use in modulating the gate voltage output on the VG pin 156 by the SRC IC 138. In an example, the circuit 500 further generates the drive signal at VG pin 156 to control the second electronic switch 136.

In an example, the circuit 500 comprises a voltage source 501, a current source circuit 502, a fifth electronic switch 503, a fourth capacitor 504, a ground 506, a third electronic switch 508, a fifth capacitor 510, a third resistor 512, and a fourth resistor 514. In an example, the circuit 500 comprises an amplifier 540 connected as a buffer amplifier also known as a voltage follower. In an example, the amplifier 540 is an operational amplifier. In an example, the amplifier 540 is a differential amplifier. In an example, the circuit 500 comprises a comparator 516 and a fourth electronic switch 520.

In an example, the circuit 500 comprises a first logic inverter 548, a pulse generator 550, a delay block 562, and a second logic inverter 564. In an example, the circuit 500 comprises a first D flip-flop 570, a second comparator 580, a third logic inverter 586, a second D flip-flop 590, and a multiplexer 594. In an example, the circuit 500 comprises a driver 530, a transconductance amplifier 533, a sixth electronic switch 537, and a Zener diode 536.

In an example, the on-time tracking circuit 470 described above with reference to FIG. 5 comprises the voltage source 501, the current source circuit 502, the fifth electronic switch 503, the fourth capacitor 504, the ground 506, the third electronic switch 508, the fifth capacitor 510, the third resistor 512, the fourth resistor 514, the amplifier 540, the comparator 516, the fourth electronic switch 520, the first logic inverter 548, the pulse generator 550, the delay block 562, and the second logic inverter 564. In an example, the CCM detection circuit 472 described above with reference to FIG. 5 comprises the first D flip-flop 570, the second comparator 580, the third logic inverter 586, and the second D flip-flop 590. In an example, the gate voltage driver circuit 474 described above with reference to FIG. 5 comprises the driver 530, the transconductance amplifier 533, the sixth electronic switch 537, and the Zener diode 536.

An input of the current source circuit 502 is connected to voltage source Vdd 501 or another voltage source, and an output of the current source circuit 502 is coupled to a first lead of the fifth electronic switch 503. A second lead of the fifth electronic switch 503 is coupled to a first lead of the fourth capacitor 504. A second lead of the fourth capacitor 504 is coupled to the ground 506. A first lead of the third electronic switch 508 is coupled to the first lead of the fourth capacitor 504 and a second lead of the third electronic switch 508 is coupled to a positive input 543 of the amplifier 540. The second lead of the third electronic switch 508 is coupled to a first lead of the fifth capacitor 510, and the second lead of the fifth capacitor 510 is coupled to the ground 506. A negative input 545 of the amplifier 540 is coupled to an output 544 of the amplifier 540. An operational amplifier with its negative input coupled to its output is said to be configured as a buffer amplifier or as a voltage follower.

The output 544 of the amplifier 540 is coupled to a first lead of the third resistor 512. A second lead of the third resistor 512 is coupled to a first lead of the fourth resistor 514, and a second lead of the fourth resistor 514 is coupled to the ground 506. The second lead of the third resistor 512 is coupled to a negative input 526 of the first comparator 516 and a positive input 524 of the first comparator 516 is coupled to the first lead of the fourth capacitor 504.

An input of the first logic inverter 548 is coupled to a gate on signal (e.g., VG pin 156 is turning the second electronic switch 136 on). In an example, this gate on signal is generated as a logic signal internally by the SRC IC 138. When the VG pin 156 is turning the second electronic switch 136 on, the gate on signal is logic high; when the VG pin 156 is turning the second electronic switch 136 off, the gate on signal is logic low. An output of the first logic inverter 548 is coupled to an input of the pulse generator 550, and an output of the pulse generator 550 is coupled to and controls the third electronic switch 508.

A first lead of the fourth electronic switch 520 is coupled to the first lead of the fourth capacitor 504, and a second lead of the fourth electronic switch 520 is coupled to the ground 506. In an example, the third electronic switch 508, the fourth electronic switch 520, and the fifth electronic switch 503 are bipolar junction transistors (BJTs) or field effect transistors (FETs). An input of the delay component 562 is coupled to a gate on signal (e.g., VG pin 156 is turning the second electronic switch 136 on), an output of the delay component 562 is coupled to an input of the second logic inverter 564, and an output of the second logic inverter 564 is coupled to and controls the fourth electronic switch 520.

An output 528 of the first comparator 516 is coupled to the clock input of the first D flip-flop 570. A D input of the first D flip-flop 570 is coupled to a voltage source 572. The voltage source 572 presents a voltage to the D input of the first D flip-flop 570 that corresponds to a logic high value. A reset input 574 of the first D flip-flop 570 is coupled to a gate on signal (e.g., VG pin 156 is turning the second electronic switch 136 on). The logic of the reset input 574 is negative, so when the reset input 574 is logic low, the reset is active, and the Q output 576 of the first D flip-flop 570 is set to logic low. An output 576 of the first D flip-flop 570 is the pulse 354 referred to above with reference to FIG. 3 when the switch mode DC-to-DC converter 100 operates in DCM operation mode and is the pulse 454 referred to above with reference to FIG. 4, when the switch mode DC-to-DC converter 100 is operating in CCM operation mode. In some contexts, the output 576 is referred to as a pulse step reg signal. The output 576 of the first D flip-flop 570 is coupled to a clock input 591 of the second D flip-flop 590.

A positive input 582 of the second comparator 580 is coupled to an indication of the voltage across the second electronic switch 136 (e.g., drain to source voltage), and a negative input 584 of the second comparator 580 is coupled to a voltage reference source that corresponds to the first voltage threshold described above with reference to FIG. 3. An output of the second comparator is coupled to an input of the third logic inverter 586, and an output of the third logic inverter 586 is coupled to a D input of the second D flip-flop 590.

A reset input 592 of the second D flip-flop 590 is coupled to the gate on signal. A Q output 593 of the second D flip-flop 590 is coupled to a select input of the multiplexer 594. A first input 595 of the multiplexer 594 is coupled to a first voltage source outputting a value equal to the first voltage threshold described above with reference to FIG. 3, and a second input 597 of the multiplexer 594 is coupled to a second voltage source outputting a value equal to the third voltage threshold described above with reference to FIG. 4.

An output of the multiplexer 594 is coupled to a negative input 535 of the transconductance amplifier 533. A positive input 534 of the transconductance amplifier 533 is coupled to the indication of the voltage across the second electronic switch 136 (e.g., drain to source voltage). An output of the transconductance amplifier 533 is coupled to VG pin 156.

An input 531 of the driver 530 is coupled to the gate on logic signal, and an output 532 of the driver 530 is coupled to the VG pin 156. A first lead of the sixth electronic switch 537 is coupled to the VG pin 156, and a second lead of the sixth electronic switch 537 is coupled to a cathode lead of the Zener diode 536. An anode lead of the Zener diode 536 is coupled to ground 506. The Q output 593 of the second D flip-flop is coupled to and controls the sixth electronic switch 537 via control 538.

In an example, the first comparator 516 is replaced by a differential amplifier in series with an analog-to-digital converter (ADC). In an example, the second comparator 580 is replaced by a differential amplifier in series with an ADC.

When the fifth electronic switch 503 is closed and the fourth electronic switch 520 is open, the current source circuit 502 charges the fourth capacitor 504, building up a voltage on the fourth capacitor 504 that is proportional to the duration of the gate on period (time duration 352 and 452 described above with reference to FIG. 3 and FIG. 4). In some contexts, the voltage on the fourth capacitor 504 may be said to track the duration of time the second electronic switch 136 is turned on. The fifth capacitor 510 stores a voltage that was stored in a previous switching cycle of the circuit 500. In some contexts herein, this is referred to as storing a history of the voltage present on the fourth capacitor 504. The voltage on the fifth capacitor 510 stores a voltage that is proportional to the duration of the gate on period of the previous switching cycle of the circuit 500. The voltage on the fifth capacitor 510 is buffered by the amplifier 540 (the voltage output of the amplifier 540 follows the input voltage, reducing the current load on the fifth capacitor 510 because of the very high input impedance of the positive input 543 of the amplifier 540) and is output by the output 544 of the amplifier 540 to a voltage divider formed by the third resistor 512 and the fourth resistor 514.

The voltage seen at the node coupling the third resistor 512 and the fourth resistor is given as Vout (R2/(R1+R2)), where Vout is the output of the amplifier 540, R1 is the resistance of the third resistor 512, and R2 is the resistance of the fourth resistor 514. This voltage seen at the node coupling the third resistor 512 to the fourth resistor 514 is provided to the negative input 526 of the comparator 516. The positive input 524 of the first comparator 516 is connected to and driven by the voltage on the fourth capacitor 504. In an example the resistance of the fourth resistor 514 is nine times the resistance of the third resistor 512, and the voltage provided by the voltage divider (third resistor 512 and fourth resistor 514) to the positive input 526 of the comparator 516 is 9/10s or 90% of the voltage on the fifth capacitor 510. Thus, when the time duration of the on-going on-time duration—proportional to the voltage on the third capacitor 504—exceeds 90% of the time duration of the previous on-time duration—proportional to 90% of the voltage on the fifth capacitor 510—the comparator 516 generates a high value on the output 528. In some contexts, the comparator 516 generating the high value on the output 528 is referred to as triggering or outputting a trigger signal.

The reset input 574 of the first D flip-flop 570 and the reset input 592 of the second D flip-flop 590 are coupled to the gate on signal. Because the logic on the reset inputs 574, 592 is inverted, when the gate on signal is logic low, the resets are active, and the Q outputs 576, 593 are reset to logic low. The high output of the first comparator 516 causes the first D flip-flop 570, whose D input 572 is coupled to a logic high voltage, to clock and output a high logic value on its output 576 (at this time the gate on signal is logic high, so the reset inputs 574, 592 are not active). This high logic value on the output 576 of the first D flip-flop 570 in turn clocks the second D flip-flop 590, causing the second D flip-flop 590 to output the logic value provided on its D input.

The second comparator 580 compares a voltage reference value equal to the first voltage threshold to the voltage across the second electronic switch 136 (e.g., a drain-to-source voltage of a MOSFET). The output of the second comparator 580 is inverted by the third logic inverter 586. Thus, when the voltage across the second electronic switch 136 (in the sense of drain-to-source, referred to as a sensed drain to source voltage) is greater than the first voltage threshold, the output of the second comparator is high, and the output of the third inverter 586 is logic low. As described above with reference to FIG. 3, if the drain-to-source voltage is greater than the first voltage threshold at this point in the on-time period (when the first comparator 516 switches state from low to high and clocks the first D flip-flop 570), this implies that the switch mode DC-to-DC converter 100 is operating in DCM operation mode. Thus a low logic value of the Q output 593 of the second D flip-flop 590 signifies DCM operation mode.

By contrast, if the first voltage threshold on the negative input 584 of the second comparator 580 is less than (i.e., is more negative) the voltage across the second electronic switch 136 (in the sense of drain-to-source, referred to as a drain to source voltage), then the output of the second comparator 580 is logic low, the output of the third logic inverter 586 is logic high, and the output of the Q output 593 of the second D flip-flop 590 is logic high. As described above with reference to FIG. 4, if the drain-to-source voltage is less than the first voltage threshold at this point in the on-time period (when the first comparator 516 switches state from low to high and clocks the first D flip-flop 570), this implies that the switch mode DC-to-DC converter 100 is operating in CCM operation mode. Thus a logic high output of the Q output 593 of the second D flip-flop 590 signifies CCM operation mode.

The Q output 593 of the second D flip-flop 590 drives the selector input of the multiplexer 594. When the selector is driven low (e.g., DCM operation mode), the multiplexer 594 bridges the voltage on its first input 595, namely a voltage equal to the first voltage threshold, to its output. When the selector is driven high (e.g., CCM operation mode), the multiplexer 594 bridges the voltage on its second input 597, namely a voltage equal to the third voltage threshold, to its output 596. The output 596 of the multiplexer 594 drives the negative input 535 of the transconductance amplifier 533, thereby providing a baseline voltage for the transconductance amplifier 533 to modulate the voltage on VG pin 156 and modulate the gate voltage on the second electronic switch 136. The effect of the circuit 500 is to modulate the gate voltage differently depending on whether the switch mode DC-to-DC converter 100 is operating in DCM operation mode or in CCM operation mode. The Zener diode 536 is connected to the VG pin 156 when the Q output of the second D flip-flop 590 is high (e.g., when the switch mode DC-to-DC converter 100 is operating in CCM operation mode) and helps to maintain the appropriate gate voltage. The driver 530 further helps to maintain the appropriate gate voltage.

When the gate is turned off, the gate on logic signal is low, the fifth electronic switch 503 is controlled open, the current source circuit 502 stops charging the fourth capacitor 504, and the fourth capacitor 504 stores a voltage that is proportional to the duration of the gate on period. When the gate on logic signal is low, the output of the first logic inverter 548 is high and causes the pulse generator 550 to generate a short high pulse which causes the third electronic switch 508 to close momentarily (about 40 ns) and then reopen. While the third electronic switch 508 is closed, the fifth capacitor 510 charges to the voltage level stored on the fourth capacitor 504, thereby storing an indication of the gate on duration period. When the third electronic switch 508 reopens, the fifth capacitor 510 is again isolated from the fourth capacitor. When the gate on logic signal transitions from high to low, the low logic signal is delayed by the delay block 562. The delay time of the delay block 562 is selected to allow the third electronic switch 508 to close and open before propagating the gate on logic low value. The low logic signal output by the delay block 562 input to the second logic inverter 564, and the second logic inverter 564 outputs a logic high that causes the fourth electronic switch 520 to close, causing the fourth capacitor 504 to discharge to ground. The fourth capacitor 504 will not be connected to the current source circuit 502 and hence does not recharge, because the fifth electronic switch 503 is open until the gate on logic signal goes high and controls the fifth electronic switch 503 closed.

Figure 7A:
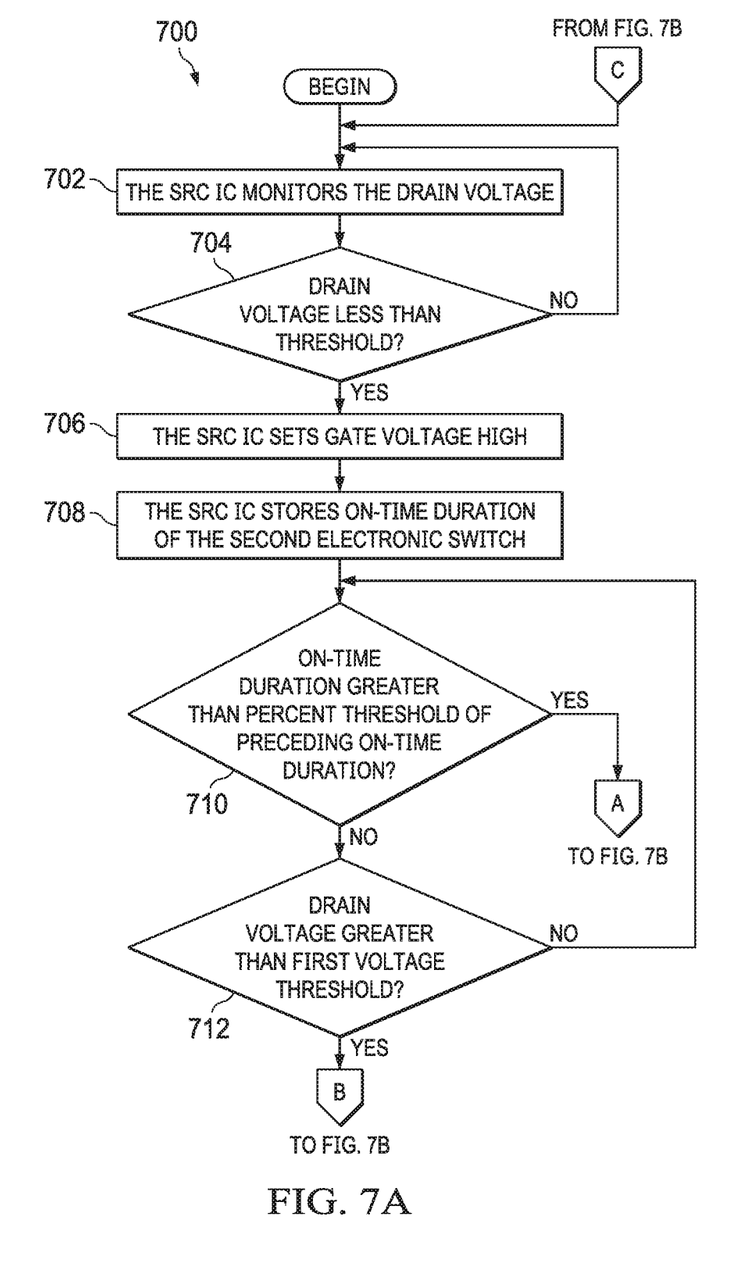
FIG. 7A and FIG. 7B depict a flow diagram of a method in accordance with various examples.
Figure 7B:
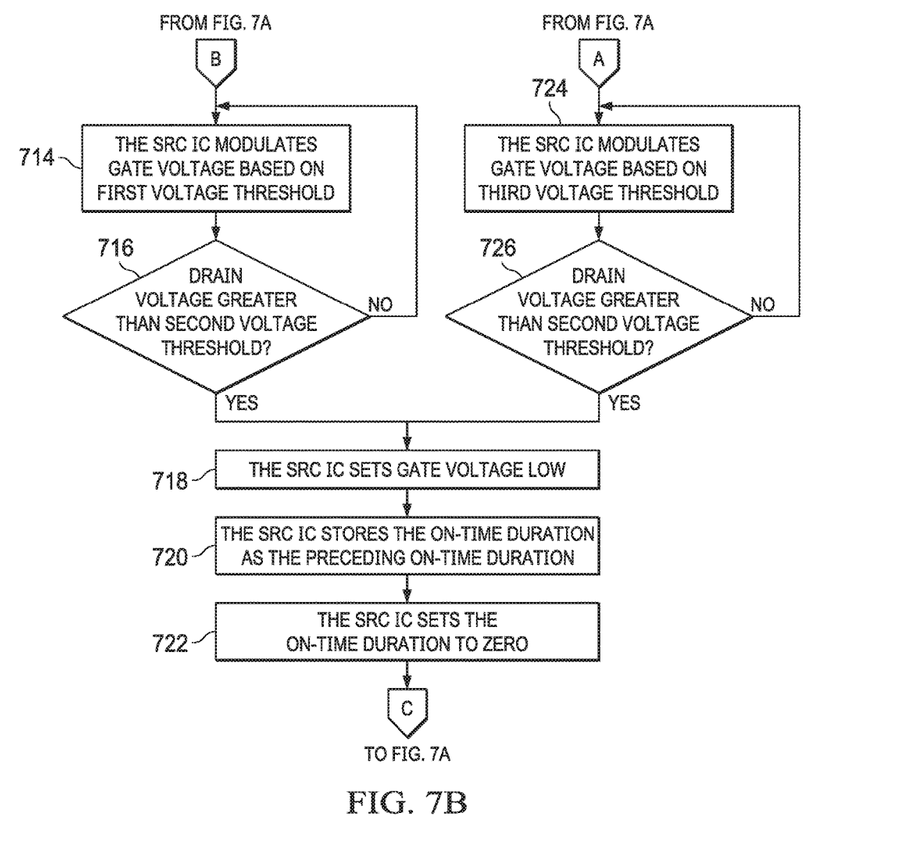

FIG. 7A and FIG. 7B illustrate a method 700 in accordance with various examples. In an example, the method 700 is performed by the SRC IC 138. The method 700 begins processing at block 702, for example when the SRC IC 138 is powered on. At block 702, the SRC IC 138 monitors the drain voltage of the second electronic switch 136. At block 704, if the drain voltage is less than a predefined turn-on threshold, the processing proceeds to block 706. In an example, at block 704, if the drain voltage is less than about −200 mV (e.g., if the drain-to-source voltage is negative), the processing proceeds to block 706; otherwise, the processing returns to block 702. Alternatively, in an example, at block 704, if the drain voltage is less than about −100 mV, the processing proceeds to block 706; otherwise, the processing returns to block 702. Alternatively, in an example, at block 704, if the drain voltage is less than about −50 mV, the processing proceeds to block 706; otherwise, the processing returns to block 702. Alternatively, in an example, at block 704, if the drain voltage is less than 0 volts, the processing proceeds to block 706; otherwise, the processing returns to block 702. Alternatively, in an example, at block 704, if the drain voltage is less than a voltage between 0 volts and −2 volts (e.g., the predefined turn-off threshold), the processing proceeds to block 706; otherwise, the processing returns to block 702.

At block 706, the SRC IC sets the gate voltage of the second electronic switch 136 high (e.g., turns the second electronic switch 136 on). At block 708, the SRC IC 138 determines and stores an on-time duration of the second electronic switch 136. In an example, the SRC IC 138 continues to store or accumulate the on-time duration of the second electronic switch 136 until block 718 has been performed.

At block 710, if the on-time duration is greater than a percentage threshold of a preceding on-time duration (e.g., the on-time duration accumulated and stored during a previous iteration of the processing loop of method 700), the processing proceeds to bubble A and to block 724 shown in FIG. 7B. If the on-time duration is less than the percentage threshold of the preceding on-time duration, the method goes to block 712. At block 712, if the drain voltage is greater than the first voltage threshold (e.g., greater than −50 mV), the processing proceeds to bubble B and to block 714 shown in FIG. 7B. If the drain voltage is less than the first voltage threshold (e.g., less than −50 mV), the processing proceeds to block 710. In an example, the percentage threshold is about 90 percent.

At block 714, the SRC IC 138 modulates the gate voltage of the second electronic switch 136 based on the first voltage threshold (e.g., −50 mV). At block 716, if the drain voltage is greater than the second voltage threshold (e.g., −5 mV), the processing proceeds to block 718. If the drain voltage of the second electronic switch 136 is less than the second voltage threshold (e.g., −5 mV) the processing returns to block 714.

At block 724, the SRC IC 138 modulates the gate voltage of the second electronic switch 136 based on the third voltage threshold (e.g., −150 mV). At block 726, if the drain voltage is greater than the second voltage threshold (e.g., −5 mV), the processing proceeds to block 718. If the drain voltage of the second electronic switch 136 is less than the second voltage threshold (e.g., −5 mV) the processing returns to block 724.

At block 718, the SRC IC 138 sets the gate voltage of the second electronic switch 136 low (e.g., turns off the second electronic switch 136). At block 720, the SRC IC 138 stores the on-time duration as the preceding on-time duration (e.g., for use in block 710 in the next iteration of method 700). At block 722 the SRC IC 138 sets the on-time duration to zero. The processing proceeds to bubble C and to block 702 shown on FIG. 7A. In an example, the method 700 is an infinite processing loop that continues reiterating until power is removed from the SRC IC 138 or until an event or other interrupt causes the processing of the SRC IC 138 to exit the method 700.

In the foregoing discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection or through an indirect connection via other devices and connections. Similarly, a device that is coupled between a first component or location and a second component or location may be through a direct connection or through an indirect connection via other devices and connections. An element or feature that is "configured to" perform a task or function may be configured (e.g., programmed or structurally designed) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof. Additionally, uses of the phrases "ground" or similar in the foregoing discussion are intended to include a chassis ground, an Earth ground, a floating ground, a virtual ground, a digital ground, a common ground, and/or any other form of ground connection applicable to, or suitable for, the teachings of the present disclosure. Unless otherwise stated, "about," "approximately," or "substantially" preceding a value means+/−10 percent of the stated value.

The above discussion is meant to be illustrative of the principles and various embodiments of the present disclosure. Numerous variations and modifications will become apparent to those skilled in the art once the above disclosure is fully appreciated. It is intended that the following claims be interpreted to embrace all such variations and modifications.

What is claimed is:

1. A synchronous rectifier controller integrated circuit, comprising:
    a continuous current mode (CCM) detection circuit configured to detect CCM operation based on a sensed voltage at a pre-defined point in a rectification cycle;
    a multiplexer having a first reference voltage signal input, a second reference voltage signal input, an output, and a selector input coupled to the CCM detection circuit; and
    a gate voltage driver circuit coupled to the output of the multiplexer.

2. The integrated circuit of claim 1, further comprising an on-time tracking circuit coupled to the CCM detection circuit, the on-time duration detection circuit including:
    a current source circuit;
    a first electronic switch having a first lead coupled to the current source;
    a first capacitor having a first lead coupled to a second lead of the first electronic switch and a second lead coupled to a ground terminal;
    a second electronic switch having a first lead coupled to the first lead of the first capacitor;
    a second capacitor having a first lead coupled to a second lead of the second electronic switch and a second lead coupled to ground;
    an amplifier having a positive input coupled to the first lead of the second capacitor and a negative input coupled to an output of the amplifier;
    a first resistor having a first lead coupled to the output of the amplifier;
    a second resistor having a first lead coupled to a second lead of the first resistor, and a second lead coupled to ground; and
    a comparator having a first input coupled to the first lead of the first capacitor, a second input coupled to the second lead of the first resistor, and an output, wherein the output of the comparator is the output of the on-time duration detection circuit.

3. The integrated circuit of claim 1, wherein the CCM detection circuit comprises a comparator having: an output coupled to the selector input of the multiplexer, a first input coupled to a drain-to-source voltage reference, and a second input coupled to the first reference voltage signal input.

4. The integrated circuit of claim 3, wherein the gate driver circuit comprises a transconductance amplifier having: a first input coupled to the output of the multiplexer, a second input, and an output that is coupled to a gate voltage output of the gate driver circuit.

5. The integrated circuit of claim 4, wherein the gate voltage driver circuit comprises a driver and a Zener diode.

6. A synchronous rectifier controller integrated circuit (SRC IC), comprising:
    an on-time tracking circuit configured to store an on-time duration of a previous switching cycle of the SRC IC, to track an on-time duration in a current switching cycle of the SRC IC, and to output a trigger signal via an output of the on-time tracking circuit;
    a continuous current mode (CCM) detection circuit coupled to the output of the on-time tracking circuit and configured to output a CCM detected signal based on determining that a value of a drain to source voltage of the SRC IC is less than a first threshold value;
    a multiplexer having a selector input coupled to the CCM detection circuit and configured to couple a first reference voltage source to an output of the multiplexer when the selector input receives a logic high value and to couple a second reference voltage source to the output of the multiplexer when the selector input receives a logic low value; and
    a gate voltage driver circuit coupled to the output of the multiplexer, wherein the gate voltage driver circuit drives a gate pin of the SRC IC to modulate the drain to source voltage of the SRC IC based on a value of a voltage present on the output of the multiplexer.

7. The synchronous rectifier controller integrated circuit of claim 6, wherein the continuous current mode (CCM) detection circuit determines the value of the drain to source voltage of the SRC IC when the trigger signal is received from the on-time tracking circuit.

8. The synchronous rectifier controller integrated circuit of claim 7, wherein the on-time tracking circuit outputs the trigger signal when the on-time duration in the current switching cycle of the SRC IC exceeds a predefined fraction of a stored on-time duration of the previous switching cycle of the SRC IC.

9. The synchronous rectifier controller integrated circuit of claim 8, wherein the predefined fraction of the stored on-time duration is about 9/10.

10. The synchronous rectifier controller integrated circuit of claim 6, wherein the first threshold value is about −50 mV.

11. The synchronous rectifier controller integrated circuit of claim 6, wherein the first reference voltage source provides a reference voltage signal of about −150 mV and the second reference voltage source provides another reference voltage signal of about −50 mV.

12. The synchronous rectifier controller integrated circuit of claim 6, wherein the first reference voltage source provides a reference voltage signal of about −50 mV and the second reference voltage source provides another reference voltage signal of about −150 mV.

13. The synchronous rectifier controller integrated circuit of claim 6, wherein the on-time tracking circuit further comprises:
   a current source;
   a first electronic switch having a first lead coupled to the current source;
   a first capacitor having a first lead coupled to a second lead of the first electronic switch and a second lead coupled to ground;
   a second electronic switch having a first lead coupled to the first lead of the first capacitor;
   a second capacitor having a first lead coupled to a second lead of the second electronic switch and a second lead coupled to ground;
   an amplifier having a positive input coupled to the first lead of the second capacitor and a negative input coupled to an output of the amplifier;
   a first resistor having a first lead coupled to the output of the amplifier;
   a second resistor having a first lead coupled to a second lead of the first resistor, and a second lead coupled to ground; and
   a comparator having a first input coupled to the first lead of the first capacitor, a second input coupled to the second lead of the first resistor, and an output, wherein the output of the comparator is the output of the on-time duration detection circuit.

14. The synchronous rectifier controller integrated circuit of claim 6, wherein the gate voltage driver circuit comprises a driver and a Zener diode.

15. A flyback switch mode direct current-to-direct current (DC-to-DC) converter, comprising:
   a primary winding coupled to an electrical power supply and a first electronic switch;
   a secondary winding configured to receive energy from the primary winding via magnetic flux coupling between the primary winding and the secondary winding;
   a second electronic switch configured to rectify electrical current in the secondary winding; and
   a synchronous rectifier controller integrated circuit, comprising:
      a continuous current mode (CCM) detection circuit coupled to the second electronic switch;
      a multiplexer having a selector input coupled to the CCM detection circuit having a first signal input configured to receive a first reference voltage signal, a second signal input configured to receive a second reference voltage signal, and an output; and
      a gate voltage driver circuit coupled to the output of the multiplexer and configured to control the second electronic switch.

16. The flyback switch mode DC-to-DC converter of claim 15, wherein the second electronic switch is a metal oxide semiconductor field effect transistor (MOSFET).

17. The flyback switch mode DC-to-DC converter of claim 15, wherein the multiplexer is configured to couple the first reference voltage signal to the output of the multiplexer when the selector input receives a high logic value from the CCM detection circuit and to couple the second reference voltage signal to the output of the multiplexer when the selector input receives a low logic value from the CCM detection circuit and wherein the gate voltage driver circuit is configured to modulate a gate voltage output of the gate voltage driver circuit based on a voltage received from the multiplexer.

18. The flyback switch mode DC-to-DC converter of claim 17, wherein the synchronous rectifier controller integrated circuit further comprises an on-time tracking circuit configured to store an on-time duration of a previous switching cycle of the SRC IC, to track an on-time duration in a current switching cycle of the SRC IC, and to output a trigger signal on an output of the on-time tracking circuit when the on-time duration in the current switching cycle of the SRC IC exceeds a predefined fraction of the stored on-time duration of the previous switching cycle of the SRC IC, wherein the CCM detection circuit is coupled to the output of the on-time tracking circuit and is configured to detect a continuous current mode of operation of a flyback switch mode direct current to direct current (DC-to-DC) converter in which the synchronous rectifier controlled integrated circuit is configured to be embedded when it receives the trigger signal from the on-time tracking circuit.

19. The flyback switch mode DC-to-DC converter of claim 15, wherein the gate voltage driver circuit comprises a transconductance amplifier having a first input coupled to the output of the multiplexer, a second input coupled to the drain to source voltage reference and an output that is coupled to a gate voltage output of the gate voltage driver circuit.

* * * * *